US010191920B1

(12) United States Patent
Grundmann et al.

(10) Patent No.: US 10,191,920 B1
(45) Date of Patent: Jan. 29, 2019

(54) GRAPHICAL IMAGE RETRIEVAL BASED ON EMOTIONAL STATE OF A USER OF A COMPUTING DEVICE

(71) Applicant: Google LLC, Mountain View, CA (US)

(72) Inventors: Matthias Grundmann, San Jose, CA (US); Karthik Raveendran, San Francisco, CA (US); Daniel Castro Chin, Atlanta, GA (US)

(73) Assignee: Google LLC, Mountain View, CA (US)

( * ) Notice: Subject to any disclaimer, the term of this patent is extended or adjusted under 35 U.S.C. 154(b) by 649 days.

(21) Appl. No.: 14/833,887

(22) Filed: Aug. 24, 2015

(51) Int. Cl.
| | |
|---|---|
| *G06F 17/30* | (2006.01) |
| *G06F 3/0484* | (2013.01) |
| *G06F 3/0482* | (2013.01) |
| *G06K 9/00* | (2006.01) |
| *G06T 11/60* | (2006.01) |

(52) U.S. Cl.
CPC ...... *G06F 17/30268* (2013.01); *G06F 3/0482* (2013.01); *G06F 3/04842* (2013.01); *G06F 17/30598* (2013.01); *G06K 9/00255* (2013.01); *G06K 9/00288* (2013.01); *G06K 9/00302* (2013.01); *G06T 11/60* (2013.01)

(58) Field of Classification Search
USPC ........................................................ 707/738
See application file for complete search history.

(56) References Cited

U.S. PATENT DOCUMENTS

| | | | |
|---|---|---|---|
| 2008/0059570 A1* | 3/2008 | Bill ...................... | G06Q 10/10 709/203 |
| 2009/0110246 A1* | 4/2009 | Olsson .............. | H04M 1/72544 382/118 |
| 2011/0134026 A1* | 6/2011 | Kang ...................... | G06F 3/011 345/156 |
| 2012/0069028 A1 | 3/2012 | Bouguerra | |
| 2013/0147933 A1* | 6/2013 | Kulas ............... | H04N 21/41407 348/61 |
| 2014/0157153 A1* | 6/2014 | Yuen ..................... | A63F 13/537 715/758 |

(Continued)

OTHER PUBLICATIONS

Miaomiao Wen et al., "OMG UR Funny! Computer-Aided Humor with an Application to Chat," Carnegie Mellon University and Microsoft Research, Jun. 6, 2015, 8 pp.

(Continued)

*Primary Examiner* — James Trujillo
*Assistant Examiner* — Aida Z Tessema
(74) *Attorney, Agent, or Firm* — IP Spring

(57) ABSTRACT

A computing device is described that includes a camera configured to capture an image of a user of the computing device, a memory configured to store the image of the user, at least one processor, and at least one module. The at least one module is operable by the at least one processor to obtain, from the memory, an indication of the image of the user of the computing device, determine, based on the image, a first emotion classification tag, and identify, based on the first emotion classification tag, at least one graphical image from a database of pre-classified images that has an emotional classification that is associated with the first emotion classification tag. The at least one module is further operable by the at least one processor to output, for display, the at least one graphical image.

14 Claims, 7 Drawing Sheets

(56) References Cited

U.S. PATENT DOCUMENTS

| | | | | |
|---|---|---|---|---|
| 2014/0192134 A1* | 7/2014 | Jung | ................. | G06K 9/00255 |
| | | | | 348/14.02 |
| 2015/0054716 A1* | 2/2015 | Hirabayashi | ....... | G02B 27/0093 |
| | | | | 345/8 |
| 2015/0149925 A1* | 5/2015 | Weksler | ................ | H04L 51/046 |
| | | | | 715/752 |
| 2015/0200881 A1* | 7/2015 | Zheng | ..................... | H04L 51/18 |
| | | | | 345/473 |
| 2016/0154825 A1* | 6/2016 | Yao | ................... | G06F 17/30268 |
| | | | | 382/218 |

OTHER PUBLICATIONS

Modminds Entertainment, "Reactions—funny texting pies," Android Apps on Google Play, Retrieved from <https://play.google.com/store/apps/details?id=com.reacticons.app&hl=en> on Jun. 13, 2014, 3 pp.

\* cited by examiner

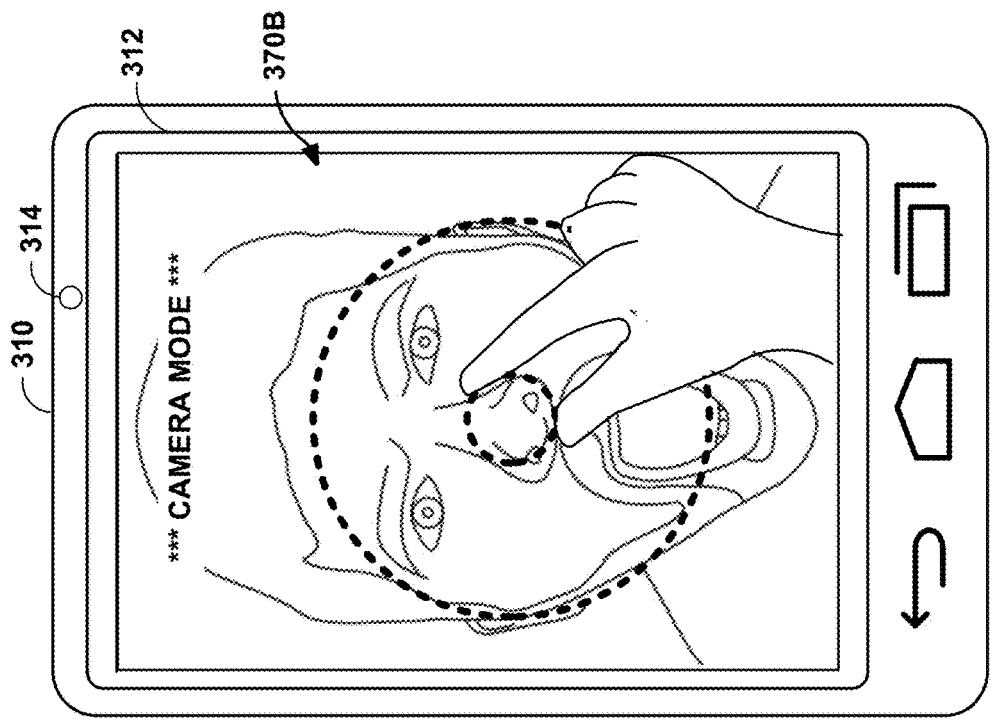
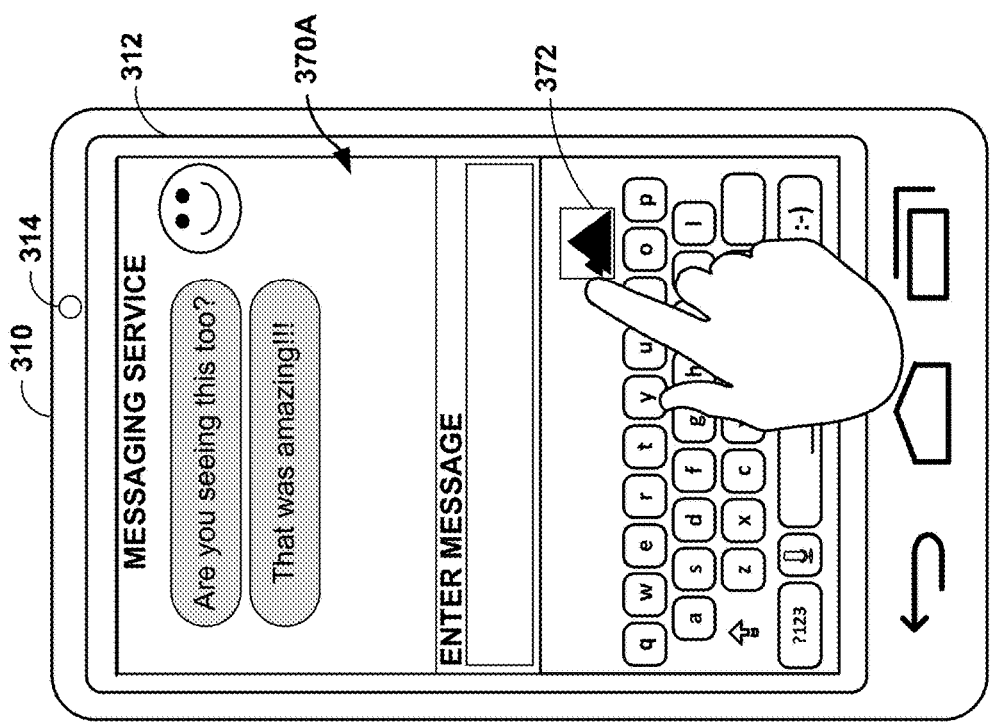

GRAPHICAL IMAGE RETRIEVAL BASED ON EMOTIONAL STATE OF A USER OF A COMPUTING DEVICE

BACKGROUND

Some computing devices (e.g., mobile phones, tablet computers, etc.) provide graphical keyboards, handwriting recognition systems, speech-to-text systems, and other types of user interfaces ("UIs") for composing electronic documents and messages. Such user interfaces may provide ways for a user to input text as well as some other limited forms of media content (e.g., emotion icons or so-called "emoticons", graphical images, voice input, and other types of media content) interspersed within the text of the documents or messages.

BRIEF DESCRIPTION OF DRAWINGS

FIGS. 3A-3E are conceptual diagrams illustrating example screen shots of a graphical user interface of a computing device configured to retrieve graphical images that correspond to an emotion of a user, in accordance with one or more techniques of the present disclosure.

DETAILED DESCRIPTION

Figure 1:
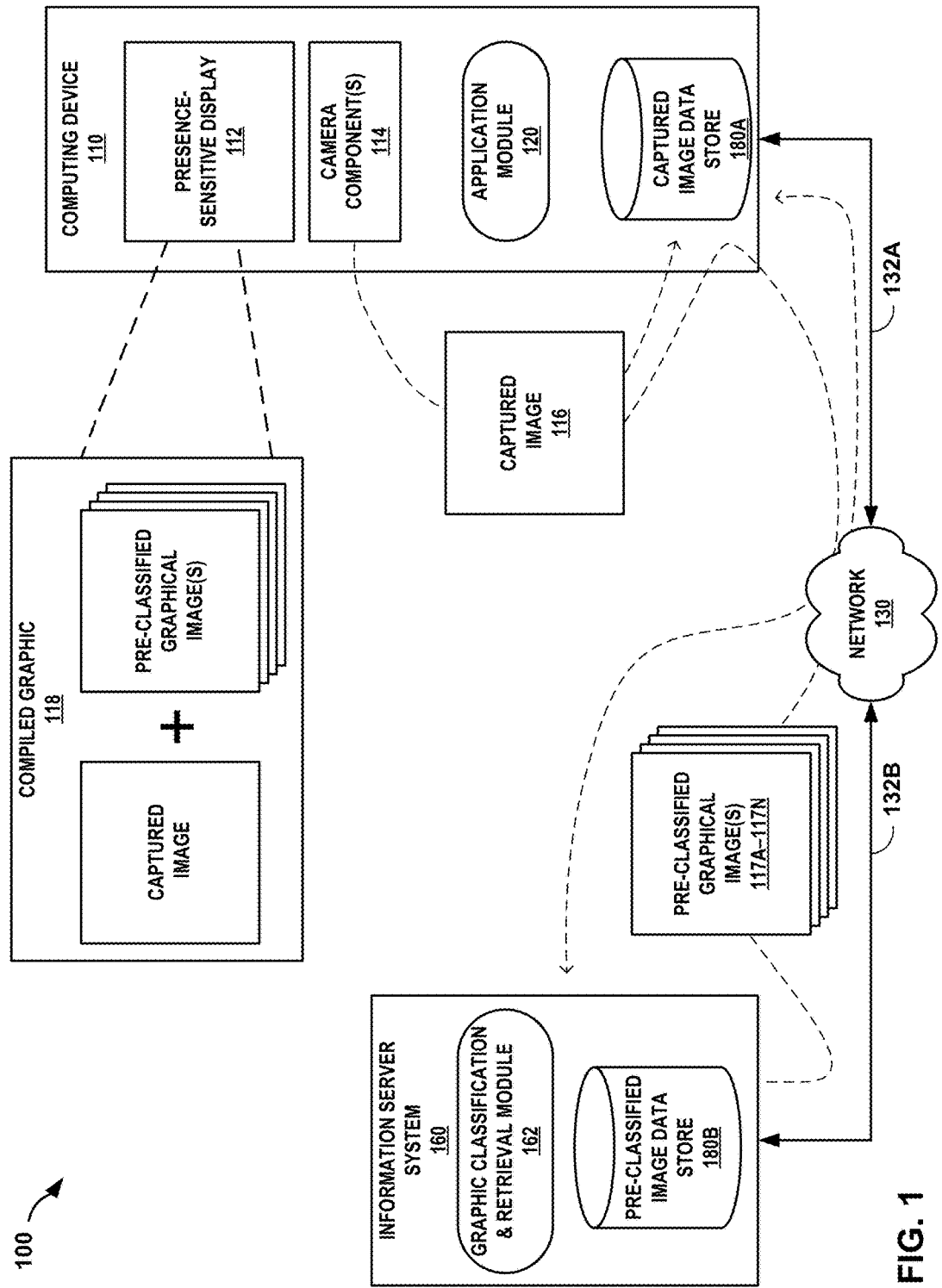
FIG. 1 is a conceptual diagram illustrating an example system configured to retrieve graphical images that correspond to an emotion of a user of a computing device, in accordance with one or more aspects of the present disclosure.

In general, techniques of this disclosure may enable a computing device to infer an emotion of a user based at least in part on an image or video (collectively referred to herein simply as "an image") of the user and automatically retrieve a graphical image (e.g., an animation, a movie clip, a cartoon, or other graphical image) that corresponds to the emotion of the user. For example, a user may cause a camera of a computing device to take a photo of his or her face. The computing device may analyze facial features and other characteristics of the photo that may change depending on a person's emotional state to determine one or more emotion classification tags. Examples of emotion classification tags include, for instance, eye shape, mouth opening size, nostril shape, eyebrow position, and other facial features and attributes that might change based on human emotion. The computing device may then identify one or more graphical images with an emotional classification (also referred to herein as "a human emotion") that is associated with the one or more emotion classification tags. Examples of emotional classifications include anger, fear, anxiety, happiness, sadness, and other emotional states. Using an emotional classification for an image, the computing device can find a graphical image with emotional content similar to the image that was captured by the camera.

For example, the computing device may determine that a captured image includes certain facial elements that define first-order emotion classification tags, such as wide open eyes and flared nostrils, and may match the first-order emotion classification tags with a second order emotional classification such as shock or fear. Based on the second-order emotional classification, the computing device may identify one or more graphical images that may similarly depict the emotion likely being expressed by the user in the captured image. For example, the computing device may retrieve a graphical image of a famous actor or actress that has been classified as having a shocked or fearful facial expression.

The computing device may output the one or more identified graphical images for display, for instance, as part of a graphical user interface. The graphical user interface may provide the user with an opportunity to select one or more of the identified graphical images, for example, to include in the body of a message or document.

Throughout the disclosure, examples are described wherein a computing device and/or computing system may analyze information (e.g., locations, speeds, accelerations) associated with the computing device and information (e.g., captured images, communications, calendars, files and notes) associated with the user of the computing device only if the computing device and/or the computing system receives explicit permission from the user of the computing device to analyze the information. For example, in situations discussed below in which the computing device and/or computing system may collect or may make use of information and images associated with the user and the computing device, the user may be provided with an opportunity to provide input to control whether programs or features of the computing device and/or computing system can collect and make use of user images and information (e.g., photographs, video, information about a user's e-mail, a user's social network, social actions or activities, profession, a user's preferences, or a user's past and current location), or to dictate whether and/or how the computing device and/or computing system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and/or computing system.

FIG. 1 is a conceptual diagram illustrating an example system configured to retrieve graphical images that correspond to an emotion of a user of a computing device, in accordance with one or more aspects of the present disclosure. System 100 includes computing device 110, information server system 160, and network 130. Although shown as separate devices, in some examples, computing device 110 and information server system 160 represent a single computing device. In some examples, computing device 110 may include at least some of the functions or capability of information server system 160, and vice versa.

Network 130 represents any public or private communication network, for instance, a cellular, Wi-Fi, and/or other type of network for transmitting data between computing devices. Computing device 110 and information server system 160 may send and receive data across network 130 using any suitable communication techniques. For example, computing device 110 may be operatively coupled to network 130 using network link 132A and information server system 160 may be operatively coupled to network 130 by network link 132B. Network 130 may include network hubs, network switches, network routers, and other network devices that are operatively inter-coupled thereby providing for the exchange of information between computing device 110 and information server system 160. In some examples, network links 132A and 132B may be Ethernet, Asynchronous Transfer Mode (ATM) network, or other network connections and such connections may be wireless and/or wired connections.

Information server system 160 represents any suitable remote computing system, such as one or more desktop computers, laptop computers, mainframes, servers, or cloud computing systems capable of sending and receiving information across network link 132B to network 130. In some examples, information server system 160 represents a cloud computing system that provides one or more services through network 130. One or more computing devices, such as computing device 110, may access the one or more services provided by the cloud via network 130. For example, computing device 110 may store and/or access data in the cloud by communicating, via network 130, with information server system 160.

Information server system 160 includes graphic classification and retrieval module 162 (referred to herein simply as "module 162") and pre-classified image data store 180B (referred to herein simply as "data store 180B"). Module 162 may perform operations described using software, hardware, firmware, or a mixture of hardware, software, and firmware residing in and/or executing at information server system 160. Information server system 160 may execute module 162 with multiple processors or multiple devices. Information server system 160 may execute module 162 as a virtual machine executing on underlying hardware. Module 162 may execute as a service of an operating system or computing platform and may further execute as one or more executable programs at an application layer of a computing platform.

Data store 180B represents any suitable storage medium for storing data, specifically, data associated with graphical images that have been pre-classified or otherwise "tagged" with an emotional classification. Examples of graphical images include still images, videos, animations, cartoons, computer-generated images or clips, and other types of graphical images. In accordance with any appropriate copyright or privacy laws, the graphical images stored at data store 180B may depict faces of actual people (e.g., actors, actresses, famous athletes, famous historical figures, or any and all other public figures), cartoon characters, movie characters, historical characters from literature, a user's friends and family members, classmates, co-workers, or any and all other faces of items, animals, and people that are characterized by a human emotion.

Information server system 160 may collect and store graphical images at data store 180B and module 162 may classify and tag the graphical images for later retrieval according to their respective emotional classification. Alternatively, or additionally, information server system 160 may store pointers (e.g., hypertext link locations) to locations in a network (e.g., on the Internet) or at an external memory or storage device at which the graphical images and respective emotional classification are stored. Examples of different emotional classifications include anxiety, fear, anger, happiness, sadness, envy, desire, interest, shock, boredom, surprise, relief, disgust, shame, pity, and any and all other human emotions.

The information stored at pre-classified image data store 180B may be searchable by module 162 of information server system 160. For instance, module 162 may execute a query of for one or more images stored at data store 180B that are classified according to a particular emotional classification (e.g., surprised) and in response, receive one or more graphical images or locations of graphical images that include faces of individuals who match the particular emotional classification.

In some examples, information server system 160 may provide network access to the graphical images stored at data store 180B (e.g., as a cloud based service accessible via network 130). For example, information server system 160 may enable computing device 110 to send a query for one or more graphical images that are associated with a particular emotional classification and receive in return, one or more graphical images that data store 180B outputs in response to the query.

Module 162 may perform operations for classifying and retrieving graphical images that have emotional classifications that are associated with emotion classification tags. Said differently, module 162 may perform techniques for analyzing each of the graphical images stored at data store 180B and classifying each of the one or more graphical images accordingly. Module 162 may perform a lookup of an emotional classification at data store 180B to retrieve one or more graphical images that match the particular emotional classification.

Module 162 may perform a two part process to tag a graphical image with an emotional classification. Module 162 may initially analyze a graphical image for one or more facial features or body postures that are typically associated with different human emotions. This initial analysis to identify one or more facial or posture signals may generate one or more first emotion classification tags associated with an image. Examples of emotion classification tags include various facial signals, such as eye shape, eyebrow shape, lip and mouth characteristic, chin characteristic, head position, skin color, nostril shape, and other facial characteristics and features of a person that may change depending on a person's emotional state.

Module 162 may measure the shape, distance, size, and other features of the facial features of an image to derive facial characteristics. For example, module 162 may determine that a mouth is "open" or "closed" depending on the size of the gap between the upper and lower lip relative to the overall width of the mouth. Likewise, module 162 may determine whether eyes are wide or nostrils are flared depending on relative size of the eyes and nostrils as compared to other facial features.

In some examples, module 162 may determine derive facial characteristics of an image in other ways. For example, module 162 may compare an image to a set of images that have previously been classified as having "open and closed mouths" to determine whether the image matches any of the pre-classified images from the set. In some examples, module 162 may compare an image to a dataset of faces with certain emotions. In some examples, module 162 may compare an image to derive facial characteristics to a ground truth dataset to determine a user's facial expression. In some examples, module 162 may perform an image-to-image comparison while in other examples, module 162 may analyze an image using a model that is built from previous analysis of a set of ground truth images.

Subsequent to generating one or more first emotion classification tags associated with an image, module 162 may input the one or more first emotion classification tags into one or more rules for discerning human emotion from facial signals and body posture to derive an emotion classification tag associated with the graphical image. As already stated, examples of different emotional classifications include anxiety, fear, anger, happiness, sadness, envy, desire, interest, boredom, surprise, relief, disgust, shame, pity, and any and all other human emotions. For example, Table 1 below represents various rules A-N that module 162 may use to discern an emotional classification for a graphical image based on one or more emotion classification tags assigned to the graphical image.

TABLE 1

| Rule | Emotion Classification Tags | Emotional Classification |
| --- | --- | --- |
| A | Eyes wide open with dilated pupils; slightly raised eyebrows; lips slightly parted or puckered or smiling; head tilted forward. | Desire |
| B | Eyes in extended gaze and possibly damp; eyebrows slightly pulled together in middle or downwards at edges; mouth turned down at corners; head tilted to side. | Disappointment |
| C | Steady gaze of eyes at item of interest (may be squinting); slightly raised eyebrows; lips slightly pressed together; head erect or pushed forward. | Intrigue |
| D | Eyes wide open; eyebrows raised high; mouth dropped wide open with consequent lowered chin; head held back or tilted to side. | Shock |
| E | Eyes and head turned down; eyebrows held low; skin blushing red. | Embarrassment |
| F | Eyebrows tilted outwards (lowered outer edges); mouth either tilted down or smiling; head tilted. | Relief |
| G | Eyes staring; mouth corners turned down; nose turned in sneer; chin jutting. | Jealousy |
| H | Eyes looking away; face generally immobile; corners of mouth turned down or lips pulled to the side; head propped up with hand. | Boredom |
| I | Eyes wide, closed or pointing down; raised eyebrows; mouth open or corners turned down; chin pulled in; head down, white face. | Fear |
| J | Eyes cast down and possibly damp or tearful; head down; lips pinched; head down or to the side. | Sadness |
| K | Eyes wide and staring; eyebrows pulled down (especially in middle); wrinkled forehead; flared nostrils; mouth flattened or clenched teeth bared; jutting chin, red face. | Anger |
| L | Mouth smiling (open or closed); possible laughter; crows-feet wrinkles at sides of sparkling eyes; slightly raised eyebrows; head level. | Happiness |
| M | Eyes and head turned away; nostrils flared; nose twisted in sneer; mouth closed, possibly with tongue protruding; chin jutting. | Disgust |
| N | Eyes damp; eyebrows slightly pushed together; trembling lower lip; chin possibly wrinkled; head slightly tilted down. | Anxious |

In some examples, module 162 may apply a weighting to one or more of the emotion classification tags that are associated with a particular emotional classification. For instance, the emotion classification tag "eyes staring" may have a greater significance for inferring anger or fear than when determining the emotional classification of jealousy and therefore module 162 may give more weight to a person's eyes when inferring anger or fear than the amount of weight that module 162 assigns to head position or mouth shape. Nevertheless, staring eyes may be a facial feature that is somewhat prevalent in a jealous person's face and therefore module 162 may use eye stare as a factor for discerning jealousy, but may more heavily rely on mouth shape or chin position.

In any case, module 162 may perform facial recognition and image analysis techniques to first determine one or more emotion classification tags associated with a graphical image and then, before storing the image at data store 180B, module 162 may tag that image with an emotional classification that is derived from the emotion classification tags. Module 162 may perform a look up of an emotional classification to identify one or more graphical images from data store 180B that correspond to the emotional classifications.

In the example of FIG. 1, computing device 110 is a mobile computing device. However, in other examples, computing device 110 may be a tablet computer, a personal digital assistant (PDA), a laptop computer, a portable gaming device, a portable media player, an e-book reader, a watch, a television platform, an automobile navigation system, a wearable computing device (e.g., a headset device, watch device, eyewear device, a glove device), or other type of computing device.

As shown in FIG. 1, computing device 110 includes presence-sensitive display (PSD) 112. PSD 112 of computing device 110 may function as an input device for computing device 110 and as an output device. PSD 112 may be implemented using various technologies. For instance, PSD 112 may function as an input device using a presence-sensitive input component, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. PSD 112 may function as an output (e.g., display) device using any one or more display components, such as a liquid crystal display (LCD), dot matrix display, light emitting diode (LED) display, organic light-emitting diode (OLED) display, e-ink, or similar monochrome or color display capable of outputting visible information to a user of computing device 110.

Computing device 110 also includes camera component 114. Numerous examples of camera component 114 exist and include any input device configured to capture a still or video image. In some examples, camera component 114 is a front-facing camera of computing device 110. For example, camera component 114 may be configured to capture an image viewed from the front side of computing device 110 (e.g., a user's face) as the user views a graphical user interface for controlling camera component 114 that is presented at a front-facing screen, such as PSD 112. In other examples, camera component 114 is a rear-facing camera of computing device 110. For example, camera component 114 may be configured to capture an image viewed from the back side of computing device 110 as the user views the graphical user interface for controlling camera component 114.

In the example of FIG. 1, camera component 114 is shown generating captured image 116 which is stored by computing device 110 at captured image data store 180A. Captured image data store 180A represents any suitable storage medium for storing data, specifically, captured image data generated by camera component 114 when camera component 114 captures or otherwise records a still or video image. Although data store 180A may contain captured images, the information stored at data store 180A may be treated such that all personally-identifiable-information (such as name, address, telephone number, e-mail address) linking the information back to individual people may be removed before being stored at computing device 110. In addition, computing device 110 may only store captured images if the user or users associated with computing device 110 affirmatively consents to such collection of information. Computing device 110 may further provide opportunities for users to remove such consent and in which case, computing device 110 may cease collecting captured images associated with that particular user. The captured images may be organized and searchable within data store 180A (e.g., according to location, time, etc.). In some examples, captured image data store 180A may be part of, or associated with a network service that computing device 110 accesses via network 130 (e.g., a cloud-based photo sharing service or social media website).

Computing device 110 may include application module 120 for causing PSD 112 to display, as part of a graphical user interface, compiled graphic 118 which is generated from a captured image (e.g., of a user's face) and one or more pre-classified graphical images that share an emotional classification with the captured image. Application module 120 may perform operations described using software, hardware, firmware, or a mixture of hardware, software, and firmware residing in and/or executing at computing device 110. Computing device 110 may execute application module 120 with one or more processors. Computing device 110 may execute application module 120 as a virtual machine executing on underlying hardware. Application module 120 may execute as a service or component of an operating system or computing platform. Application module 120 may execute as one or more executable programs at an application layer of a computing platform.

Numerous examples of application module 120 exist and include any and all applications, services, platforms, or components thereof, from which a user can edit, and may wish to input a graphical image into, a document, video chat, e-mail, instant message, social media post, blog, or other form of electronic communication. A user of computing device 110 may interact with an interface (e.g., a graphical user interface) associated with application module 120 to cause computing device 110 to perform a function. For example, application module 120 may be a photo or video editing application, a photo or video capturing application, an e-mail application, a messaging application, a Internet browser application, a calendar application, a personal assistant or prediction engine, a search application, a map or navigation application, a transportation service application (e.g., a bus or train tracking application), a social media application, a game application, or any and all other applications that may execute at a computing device such as computing device 110.

Application module 120 may cause PSD 112 to present a graphical user interface from which a user can capture an image and based on the captured image, application module 120 may also cause computing device 110 to produce compiled graphic 118 that reflects the emotional classification of the captured image. Application module 120 may enable a user to control camera component 114 from the graphical user interface to take a photo or video, produce a compiled graphic based on the photo or video, preview the compiled graphic, and input the compiled graphic into an electronic document or communication.

In operation, application module 120 may obtain an indication of a captured image of a user of computing device 110. For example, application module 120 may cause PSD 112 to output a graphical user interface for composing a text-based message with computing device 110. Within the graphical user interface, application module 120 may cause PSD 112 to include a graphical button or other selectable element from which a user can select to have application module 120 generate a graphical image of his or her mood and include the graphical image as a compiled graphic in the body of a text message.

In response to detecting a selection of the graphical button (e.g., a gesture input at the location of PSD 112 at which the graphical button is displayed), application module 120 may cause camera component 114 to take a photo and produce captured image 116 (presumably of the user's face). Application module 120 may cause camera component 114 to store captured image 116 at captured image data store 180A.

To produce compiled graphic 118, application module 120 may determine, based on captured image 116, one or more first emotion classification tags. Application module 120 may identify, based on the one or more first emotion classification tags, at least one graphical image from a database of pre-classified images that has an emotional classification that is associated with the first emotion classification tag.

In some examples, application module 120 may assign an emotional classification to captured image 116 by performing image analysis techniques on captured image 116 to determine one or more facial features or other image characteristics or traits that may indicate the emotional state of the user. For example, application module 120 may determine relative eye shape and size, mouth shape and size, eyebrow shape and size, etc. and other facial characteristics from captured image 116. For example, application module 120 may determine one or more first emotion classification tags associated with captured image 116 that indicate the user may have: a smiling mouth, possible signs of laughter, wrinkles in the corner of her eyes, raised eyebrows, etc.

Based on one or more rules, such as the rules in Table 1, application module 120 may determine an emotional classification that fits the one or more first emotion classification tags assigned to the captured image. For example, based on the first emotion classification tags, application module 120 may determine that the captured image is associated with happiness.

In other examples, application module 120 may rely on information server system 160 and graphic classification & retrieval module 162 to analyze and classify a captured image. For example, application module 120 may output a captured image via network 130 to information server system 160 and receive an emotional classification from information server system 160 in response thereto. Application module 120 may query information server system 160 for one or more pre-classified graphical images that are associated with the emotional classification inferred from captured image 116.

For example, application module 120 may query module 162 for one or more pre-classified graphical images that are associated with happiness. In response to the query, application module 120 may receive, via network 130, one or more pre-classified graphical images 117A-117N (collectively graphical images 117) that module 162 identified within data store 180B as having an emotional classifications that correspond to happiness. Pre-classified images 117 may include images of famous actors and actresses, cartoon characters, athletes, politicians, etc.

In some examples, rather than rely on application module 120 to perform any image analysis or emotion classification tagging, module 162 may enable application module 120 to provide, via network 130, captured image 116 as an input to module 162 and in response, receive as output from module 162, one or more pre-classified graphical images 117. In other words, application module 120 may rely on information server system 160 to determine an emotion classification tag of captured image 116 and identify one or more pre-classified images that have an emotional classification associated with the emotion classification tag.

In any case, application module 120 may output at least one graphical image 117 identified based on the one of more first emotion classification tags determined from captured image 116. For example, application module 120 may compile one or more graphical images 117 returned from information server system and captured image 116 into an animation (e.g., an animated gif) that application module 120 may cause PSD 112 to output as compiled graphic 118. Application module 120 may input compiled graphic 118 into the body of a text message so that a user can send compiled graphic 118 to a friend or other contact who may wish to know the user's mood.

In this way, rather than simply providing access to generic sets of emoticons or other standard icons for insertion into an electronic document or message, the described techniques may provide convenient ways for users to locate and insert more elaborate and/or personalized types of graphical content (e.g., animations, movie clips, cartoons, and the like) into electronic messages that expresses how the user may feel. By identifying an emotional classification based on a captured image, the described techniques may enable a computing device to quickly and easily locate a graphical image that corresponds to a particular emotion without requiring the user to input text (e.g., at a web browser) to manually search for such a graphical image. Accordingly, the described techniques may minimize a quantity of input received from users manually searching for images. In addition, the described techniques may minimize bandwidth consumption typically caused by other users interacting with other computing devices to search for graphical images. By minimizing input, and reducing the need to search, the computing device may consume less electrical energy and save battery power.

Figure 2:
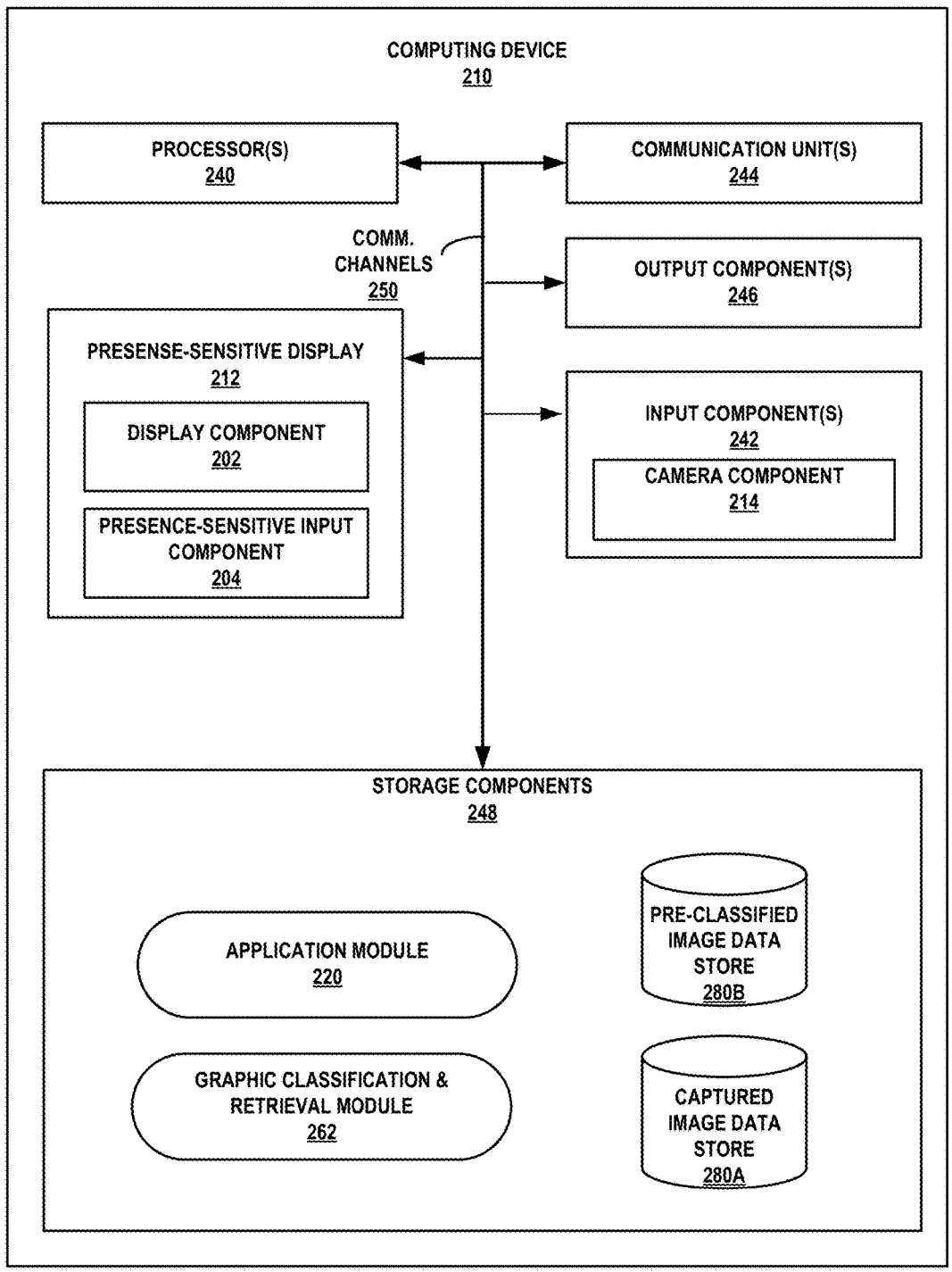
FIG. 2 is a block diagram illustrating an example computing device configured to retrieve graphical images that correspond to an emotion of a user, in accordance with one or more aspects of the present disclosure.

FIG. 2 is a block diagram illustrating computing device 210 as an example computing device configured to retrieve graphical images that correspond to an emotion of a user, in accordance with one or more aspects of the present disclosure. Computing device 210 of FIG. 2 is described below within the context of computing device 110 and system 100 of FIG. 1. Computing device 210 of FIG. 2 in some examples represents an example of computing device 110 of FIG. 1. In other examples, computing device 210 represents an example of system 100 of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes presence-sensitive display 212, one or more processors 240, one or more input components 242, one or more communication units 244, one or more output components 246, and one or more storage components 248. Presence-sensitive display (PSD) 212 includes display component 202 and presence-sensitive input component 204. Input components 242 include camera component 214.

One or more storage components 248 of computing device 210 are configured to store application module 220 and graphic classification & retrieval module 262 (referred to herein simply as "module 262"). Additionally, storage components 248 are configured to store captured image data store 280A and pre-classified image data store 280B. Collectively, data stores 280A and 280B may collectively be referred to herein as "data stores 280".

Communication channels 250 may interconnect each of the components 202, 204, 212, 214, 262, 240, 242, 244, 246, 248, and 280 for inter-component communications (physically, communicatively, and/or operatively). In some examples, communication channels 250 may include a system bus, a network connection, an inter-process communication data structure, or any other method for communicating data.

One or more input components 242 of computing device 210 may receive input. Examples of input are tactile, audio, image and video input. Input components 242 of computing device 200, in one example, includes a presence-sensitive display, touch-sensitive screen, mouse, keyboard, voice responsive system, a microphone or any other type of device for detecting input from a human or machine. In some examples, input components 242 include one or more sensor components such as one or more location sensors 290A (GPS components, Wi-Fi components, cellular components), one or more temperature sensors 290B, one or more movement sensors 290C (e.g., accelerometers, gyros), one or more pressure sensors 290D (e.g., barometer), one or more ambient light sensors 290E, and one or more other sensors 290F (e.g., microphone, camera, infrared proximity sensor, hygrometer, and the like).

Input components 242 further include camera component 214. In some examples, camera component 214 represents a still camera, a video camera, or both. Similar to camera component 114 of computing device 110, camera component 214 is configured to capture an image of a user of computing device 210. In some examples, camera component 214 is embedded in a separate, external device, such as a body camera, eyewear, or other camera device that is operatively coupled to computing device 210 and configured to capture a still or moving image of a user of computing device 210.

In some examples, camera component 214 is a forward-facing camera, a rear-facing camera, or a selectable forward and rear-facing camera. In other words, camera component 214 may be a front-facing camera that is configured to capture the image of the user by recording video of the user while graphical information associated with the camera is presented at a display, such as display component 202 of PSD 212.

One or more output components 246 of computing device 210 may generate output. Examples of output are tactile, audio, still image and video output. Output components 246 of computing device 210, in one example, includes a presence-sensitive display, sound card, video graphics adapter card, speaker, cathode ray tube (CRT) monitor, liquid crystal display (LCD), or any other type of device for generating output to a human or machine.

One or more communication units 244 of computing device 210 may communicate with external devices via one or more wired and/or wireless networks by transmitting and/or receiving network signals on the one or more networks. For example, communication units 244 may be configured to communicate over a network (e.g., network 130) with a remote computing system that stores a database of pre-classified images, such as information server system 160 of system 100. Modules 220 and/or 262 may receive, via communication units 244, from the remote computing system, an indication of the at least one graphical image in response to outputting, via communication unit 244, for transmission to the remote computing system, an indication of the first emotion classification tag. Examples of communication unit 244 include a network interface card (e.g. such as an Ethernet card), an optical transceiver, a radio frequency transceiver, a GPS receiver, or any other type of device that can send and/or receive information. Other examples of communication units 244 may include short wave radios, cellular data radios, wireless network radios, as well as universal serial bus (USB) controllers.

Presence-sensitive display (PSD) 212 of computing device 200 includes display component 202 and presence-sensitive input component 204. Display component 202 may be a screen at which information is displayed by PSD 212 and presence-sensitive input component 204 may detect an object at and/or near display component 202. As one example range, presence-sensitive input component 204 may detect an object, such as a finger or stylus that is within two inches or less of display component 202. Presence-sensitive input component 204 may determine a location (e.g., an [x, y] coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202. In the example of FIG. 2, PSD 212 may present a user interface (such as a graphical user interface for presenting a graphical image having an emotional classification that is associated with an emotion tag of a captured image).

While illustrated as an internal component of computing device 210, presence-sensitive display 212 may also represent and external component that shares a data path with computing device 210 for transmitting and/or receiving input and output. For instance, in one example, PSD 212 represents a built-in component of computing device 210 located within and physically connected to the external packaging of computing device 210 (e.g., a screen on a mobile phone). In another example, PSD 212 represents an external component of computing device 210 located outside and physically separated from the packaging of computing device 210 (e.g., a monitor, a projector, etc. that shares a wired and/or wireless data path with computing device 210).

PSD 212 of computing device 210 may receive tactile input from a user of computing device 110. PSD 210 may receive indications of the tactile input by detecting one or more gestures from a user of computing device 210 (e.g., the user touching or pointing to one or more locations of PSD 212 with a finger or a stylus pen). PSD 212 may present output to a user. PSD 212 may present the output as a graphical user interface (e.g., as graphical screen shot 116), which may be associated with functionality provided by computing device 210. For example, PSD 212 may present various user interfaces of components of a computing platform, operating system, applications, or services executing at or accessible by computing device 210 (e.g., an electronic message application, a navigation application, an Internet browser application, a mobile operating system, etc.). A user may interact with a respective user interface to cause computing devices 210 to perform operations relating to a function. For example, application module 220 may cause PSD 212 to present a graphical user interface associated with an electronic messaging function of computing device 210. The user of computing device 210 may view output and provide input to PSD 212 to compose and read messages associated with the electronic messaging function.

PSD 212 of computing device 210 may detect two-dimensional and/or three-dimensional gestures as input from a user of computing device 210. For instance, a sensor of PSD 212 may detect a user's movement (e.g., moving a hand, an arm, a pen, a stylus, etc.) within a threshold distance of the sensor of PSD 212. PSD 212 may determine a two or three dimensional vector representation of the movement and correlate the vector representation to a gesture input (e.g., a hand-wave, a pinch, a clap, a pen stroke, etc.) that has multiple dimensions. In other words, PSD 212 can detect a multi-dimension gesture without requiring the user to gesture at or near a screen or surface at which PSD 212 outputs information for display. Instead, PSD 212 can detect a multi-dimensional gesture performed at or near a sensor which may or may not be located near the screen or surface at which PSD 212 outputs information for display.

One or more processors 240 may implement functionality and/or execute instructions within computing device 210. For example, processors 240 of computing device 210 may receive and execute instructions stored by storage components 248 that execute the functionality of modules 220 and 262. The instructions executed by processors 240 may cause computing device 210 to store information within storage components 248 during program execution. Examples of processors 240 include application processors, display controllers, auxiliary processors, one or more sensor hubs, and any other hardware configure to function as a processor, a processing unit, or a processing device. Processors 240 may execute instructions of modules 220 and 262 to cause PSD 212 to present a graphical user interface including one or more graphical images from a database of pre-classified images with emotional classifications that are associated with a first emotion classification tag of a captured image of a user. That is, modules 220 and 262 may be operable by processors 240 to perform various actions or functions of computing device 210.

One or more storage components 248 within computing device 210 may store information for processing during operation of computing device 210 (e.g., computing device 210 may store data accessed by modules 220 and 262 during execution at computing device 210). In some examples, storage component 248 is a temporary memory, meaning that a primary purpose of storage component 248 is not long-term storage. Storage components 248 on computing device 220 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 may be configured to store larger amounts of information than volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220 and 262, as well as data stores 280. Storage components 248 may include a memory configured to store an image captured by camera component 214 of a user of computing device 210.

With explicit permission from a user of computing device 210, modules 220 and 272 may have access to information stored at data store 280A. For example, as described below, graphic classification & retrieval module 262 may access data store 280A for captured images of a user of computing device 210 when determining one or more pre-classified graphical images from data store 280B that have emotional classifications associated with first emotion classification tags of the captured images. The user of computing device 210 may be provided with an option for disabling or otherwise preventing module 262 from accessing data store 280A.

In some examples, module 262 includes all the functionality of module 162 of information server system 160 of system 100. In other examples, module 262 provides an application programming interface (API) associated with module 162 from which application module 120 can access the information or functions that module 162 provides (e.g., as a service executing in the cloud) for determining one or more pre-classified graphical images from data store 280B that have emotional classifications associated with first emotion classification tags of the captured images.

In operation, a user of computing device 210 may interact with a graphical user interface associated with application module 220 that PSD 212 presents at display component 202. The user may interact with the graphical user interface, for instance, to compose an electronic communication or document and may wish to insert a funny graphic compilation into the electronic document or image.

The user may provide input at presence-sensitive input component 204 for interacting with the graphical user interface presented at display component 202 so as to cause computing device 210 to capture an image of the user. In other words, PSD 212 may detect input at presence-sensitive input component 204 that triggers application module 220 to cause camera component 214 to take a digital picture while the user stares at a lens of camera component 214.

In response to the trigger from application module 220, camera component 214 may store an indication of the image of the user as information or data at captured image data store 280A. The indication of the image stored in memory may include one or more frames of video or a photographic image. After camera component 214 stores the indication of the image in memory, application module 220 may obtain the indication of the image of the user by retrieving the indication of the image of the user from data store 280A.

Application module 220 may rely on graphic classification & retrieval module 262 to determine, based on the image, a first emotion classification tag. For example, application module 220 may send the indication of the image of the user to module 262. Module 262 may determine, based on the image, one or more facial features of the user. Examples of facial features include eye opening distance, nostril size and/or relative position, and mouth opening size and lip position, skin discoloration, head position, and the like.

Based at least in part the one or more facial features, module 262 may assign one or more first-order or first emotion classification tags to the image. For example, module 262 may compare the eye opening distance to the overall size of the user's face in the image to determine whether to classify the image as having wide-open-eyes or narrow-open-eyes. Similarly, module 262 may compare the shape of the eyebrow to the overall eye and nose position to determine whether to classify the image as having an upward, downward, or scrunched up brow.

Using one or more rules, such as those defined in table 1, module 262 may determine an emotional classification associated with the one or more first emotion classification tags. For example, if module 262 determines that the eyebrows in the image are tilted outwards (e.g., with lowered outer edges), and the mouth in the image is either tilted down or smiling with the head also tilted, that the user may be exhibiting signs of relief and may tag the image with a relief type emotional classification. In other examples, if module 262 determines that the eyes in the image are "staring" with corners of the mouth turned down, the nose turned upward in a sneer, and the position of the chin appears to be jutting, that the user in the image may be exhibiting signs of jealousy and may tag the image with a jealousy type emotional classification.

In any case, after determining one or more emotional classifications associated with the image, module 262 may identify at least one graphical image from data store 280B (e.g., a database of pre-classified images) with an emotional classification that is associated with the first emotion classification tag. For example, module 262 may perform a lookup of the emotional classification associated with the image to retrieve, from the database of pre-classified images at data store 280B, the at least one graphical image. In some examples, the at least one graphical image retrieved from data store 280B may be an animated graphic (e.g., a short movie clip, an animated .GIF, or other type of animation). In some examples, the at least one graphical image retrieved from data store 280B may be a non-animated graphic (e.g., a photo, a drawing, a .JPEG file, a .BMP file, or other image).

Module 262 may return the at least one graphical image retrieved from data store 280B to application module 220. Application module 220 may output the at least one graphical image for display at display component 202. For example, application module 22 may include the at least one graphical image in the graphical user interface and allow the user to select the graphical image for inclusion in the communication or electronic document that the user is editing with computing device 210.

FIGS. 3A-3E are conceptual diagrams illustrating example screen shots of a graphical user interface of computing device 310 which represents an example computing device configured to retrieve graphical images that correspond to an emotion of a user, in accordance with one or more techniques of the present disclosure. For the sake of brevity, computing device 310 of FIGS. 3A-3D is described below within the context of computing device 210 of FIG. 2 as well as system 100 FIG. 1. Computing device 310 of FIGS. 3A-3D in some examples represents an example of computing device 210 of FIG. 2. In other examples, computing device 310 represents an example of computing device 110 or system 100 of FIG. 1.

In each of FIGS. 3A-3E, computing device 310 includes presence-sensitive screen 312 which is configured to display graphical information and receive tactile input as described above with respect to PSD 112 and 212 of FIGS. 1 and 2. FIGS. 3A-3E show a time-ordered sequence of events in which computing device 310 causes PSD 312 to display different screen shots 370A-370E as part of providing a user interface from which a user of computing device 310 can cause computing device 310 to input a graphical compilation corresponding to an emotion of captured in an image of the user, in accordance with one or more techniques of the present disclosure.

In the example of FIG. 3A, computing device 310 may cause PSD 312 to output, for display, a graphical user interface associated with an application executing at computing device 310. For example, application module 220 may cause computing device 310 to present the graphical user interface associated with screen shot 370A at PSD 312.

Screen shot 370A is associated with an instant messaging application and the user of computing device 310 is shown interacting with the graphical user interface (e.g., by typing at a graphical keyboard) to send and receive electronic communications with another user.

The graphical user interface associated with screen shot 370A includes selectable element 372 for inserting, in a communication associated with the user, a graphical image that has been retrieved from a database of pre-classified graphical images that have an emotional classification associated with an emotion classification tag assigned to an image of the user. In the example of FIG. 3A, in response to detecting a user selection of the selectable element (e.g., by detecting a tap or non-tap gesture at a location of PSD 312 at which selectable element 272 is displayed), computing device 310 may perform operations for outputting the at least one graphical image.

In the example of FIG. 3B, computing device 310 may cause PSD 312 to output, for display, a graphical user interface for controlling camera 314 of computing device 310 so that the user is provided an opportunity to capture his or her image. For example, application module 220 may cause computing device 310 to present the graphical user interface associated with screen shot 370B at PSD 312. Screen shot 370B is associated with a camera control function of camera 314 and the user of computing device 310 is shown interacting with the graphical user interface (e.g., by pinching at PSD) to zoom-in and zoom-out so as to capture his or her own image. As is shown in screen shot 370B, the user appear to have his mouth wide open to appear as though he is "shocked" or "surprised".

Figure 3C:
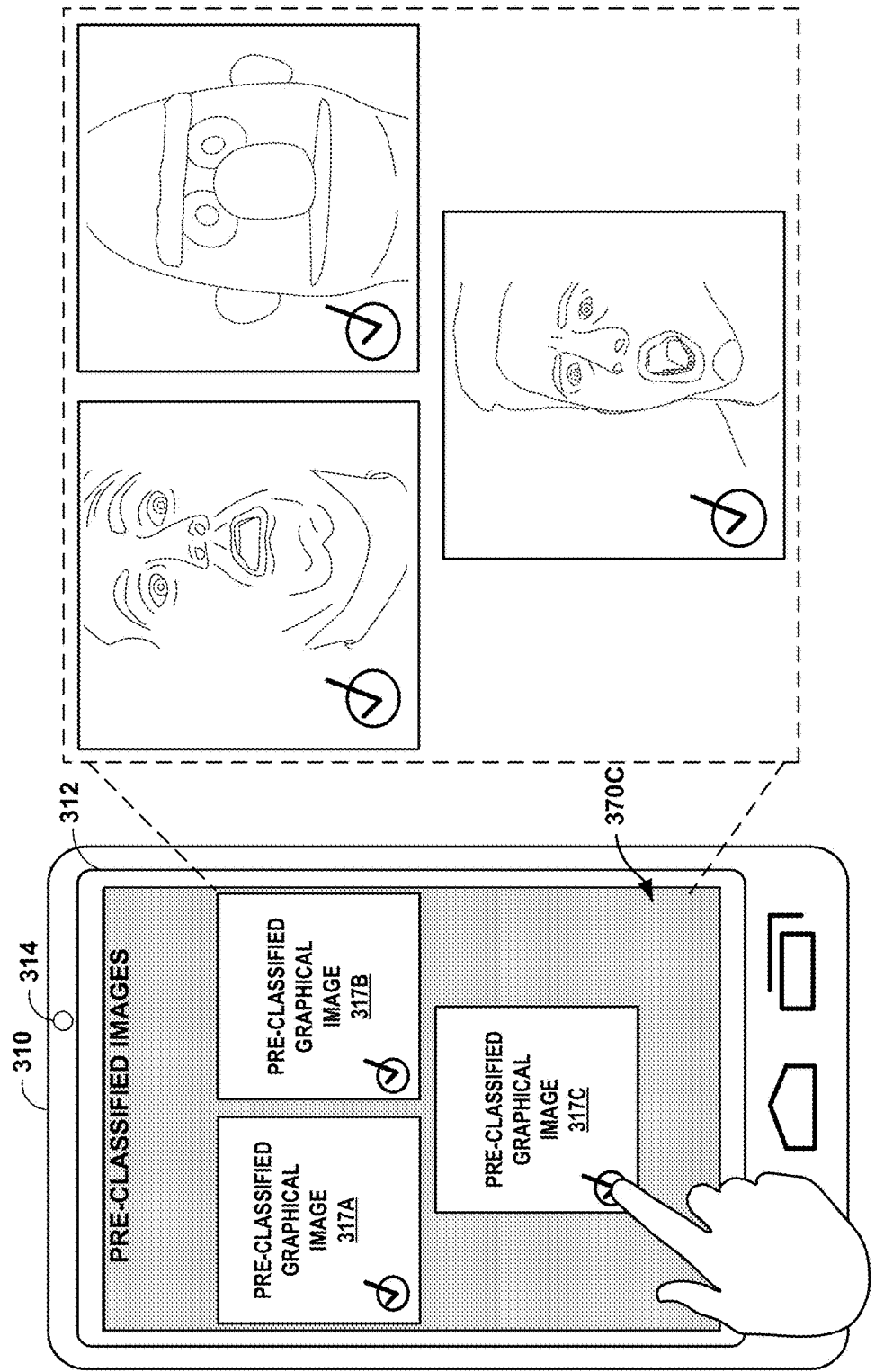

In the example of FIG. 3C, computing device 310 may cause PSD 312 to output, for display, a graphical user interface for selecting one or more graphical images 317A-317C from a database of pre-classified images with an emotional classification that is associated with the first emotion classification tag of the captured image. For example, working in conjunction with module 262, application module 220 may send the image captured in FIG. 3B to module 262 for classification. Module 262 may perform image analysis on the captured image to determine that the user's eyes and mouth are wide open. Module 262 may infer that the wide open eyes and mouth indicate that the user is shocked and may retrieve one or more graphical images 317A-317C from data store 280B that are associated with a shocked type emotional classification.

Module 262 may output the one or more graphical images 317A-317C retrieved from data store 280B to application module 220. Application module 220 may include graphical images 317A-317C as part of the graphical user interface provided by application module 220 for allowing the user of computing device 310 to select one or more of the retrieved images. For example, screen shot 370C shows graphical images 317A-317C having selection bubbles in the lower left corner from which a user can provide a tap input to select or deselect the image for inclusion in a computer generated graphical compilation.

Figure 3D:
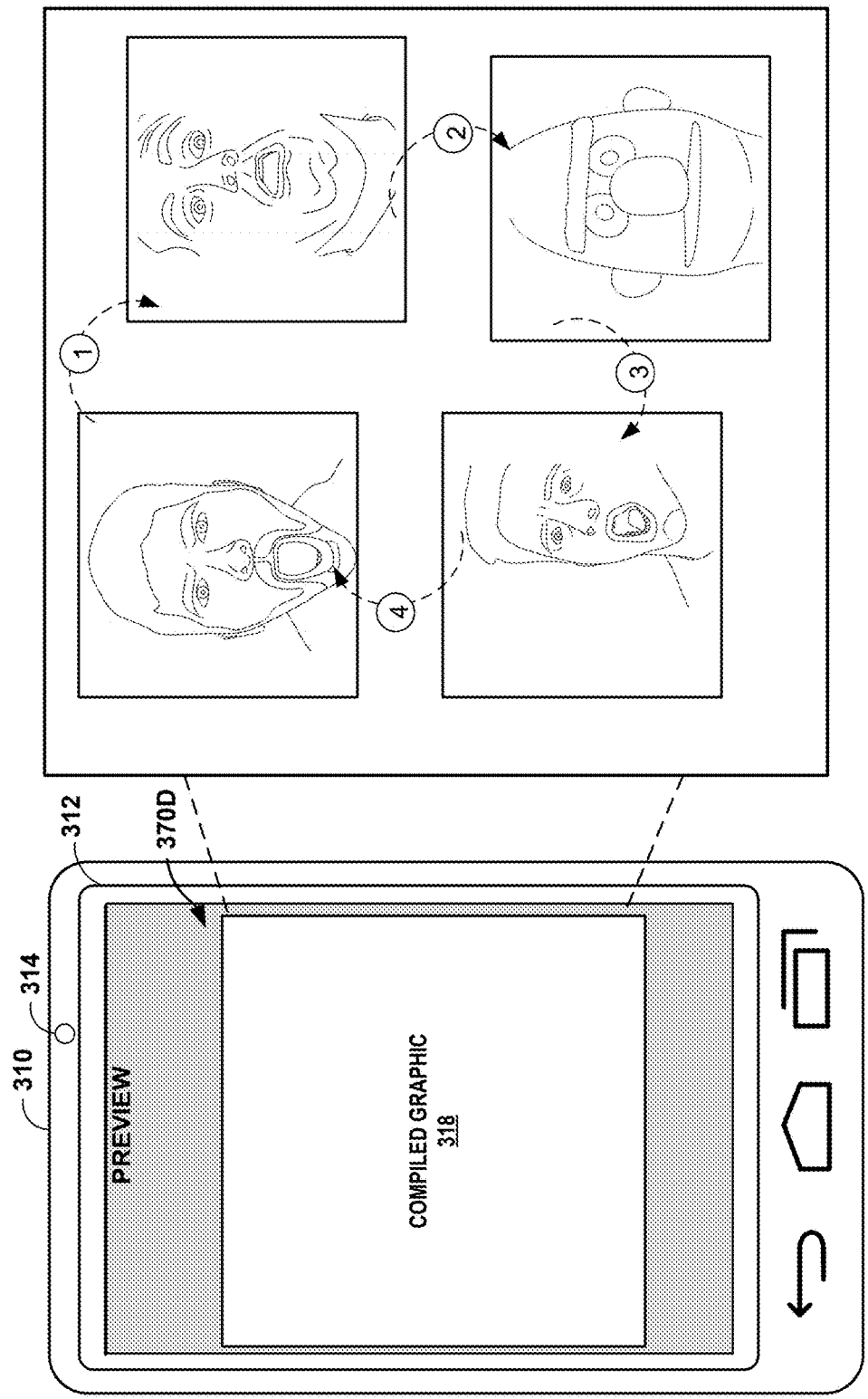

In the example of FIG. 3D, computing device 310 may cause PSD 312 to output, for display, a graphical user interface for previewing a graphical compilation generated by application module 220 based on the one or more graphical images 317A-317C selected from the graphical user interface shown in screen shot 370C. For example, application module 220 may produce graphical compilation 318. Graphical compilation 318 may be an animated graphical image that starts out showing the captured image of the user, and transitions or cycles through each of the selected graphical images. In some examples, application module 220 may cause the images to morph from one image to the next. In some examples, application module 220 may remove a foreground portion of the captured image (e.g., the user's face), and overlay the foreground portion of the image onto the at least one graphical image. For instance, application module 220 may combine the captured image of the user and one or more of the retrieved graphical images into a single graphical image that depicts the emotional sentiment of the user.

Figure 3E:
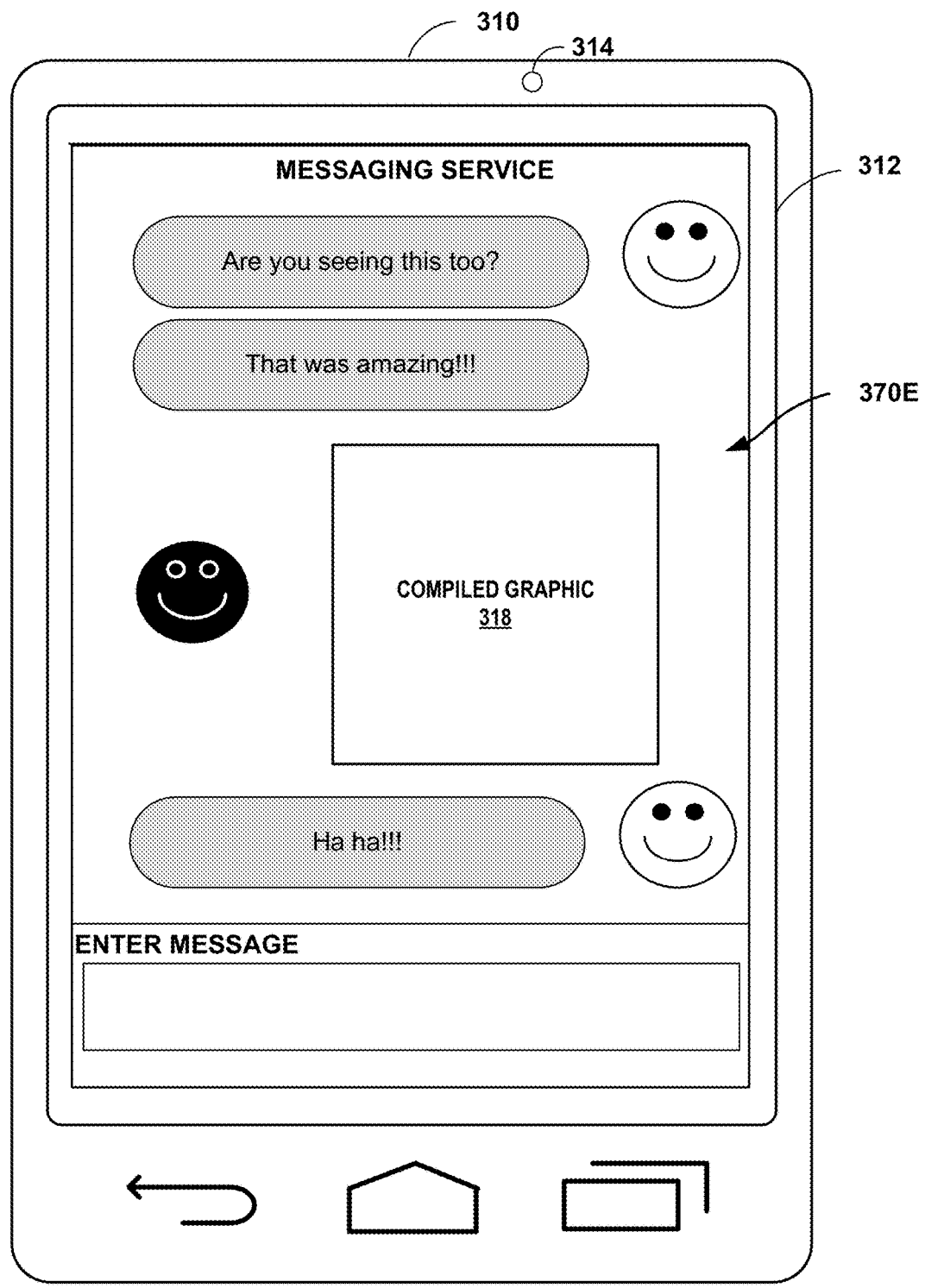

In the example of FIG. 3E, computing device 310 may cause PSD 312 to output, for display, a graphical user interface for inserting the graphical compilation generated by application module 220 into a communication associated with the user. Application module 220 may output the at least one graphical image or the graphical compilation for transmission to a remote device as part of the communication associated with the user. For example, application module 220 may cause PSD 312 to insert compiled graphic 318 into the text-based electronic communication initially shown in FIG. 3A. In this way, the user can share a sometimes funny image or graphical compilation that depicts the emotional sentiment that the user expressed in an image. The user can share with another user how he or she is feeling without having to manually search or manually create such a graphical image.

Figure 4:
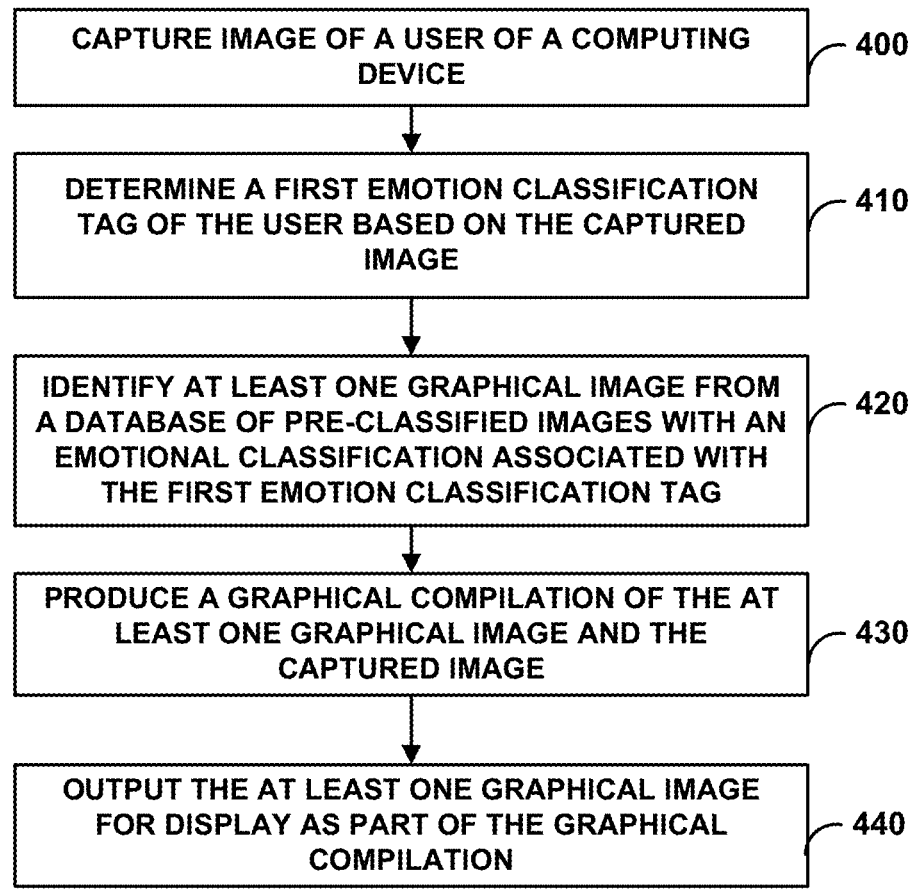
FIG. 4 is a flowchart illustrating example operations of an example computing device configured to retrieve graphical images that correspond to an emotion of a user, in accordance with one or more aspects of the present disclosure.

FIG. 4 is a flowchart illustrating example operations of an example computing device configured to retrieve graphical images that correspond to an emotion of a user, in accordance with one or more aspects of the present disclosure. The process of FIG. 4 may be performed by one or more processors of a computing device, such as computing device 110 of FIG. 1 and/or computing device 210 of FIG. 2. The steps of the process of FIG. 4 may in some examples, be repeated, omitted, and/or performed in any order. For purposes of illustration, FIG. 4 is described below within the context of computing device 210 of FIG. 2.

In the example of FIG. 4, computing device 210 may capture (400) an image of a user of computing device 210. For example, a user of computing device 210 may provide input to computing device 210 to control camera component 214 and cause camera component 214 to take a video or still image of the user's face.

Computing device 210 may determine (410) a first emotion classification tag based on the image. For instance, application module 220 may retrieve the captured image and call on module 262 to determine a first-order emotion classification tag. Module 262 may perform image analysis techniques on the image to determine facial feature shapes, positions, and states and determine one or more first emotion classifications tags. Module 262 may tag the image with the one or more first emotion classifications tags.

Computing device 210 may identify (420) at least one graphical image from a database of pre-classified images with an emotional classification that is associated with the first emotion classification tag. Module 262 may use one or more rules for inferring a second-order emotional classification of the image based on the one or more first emotion classification tags assigned to an image. Module 262 may input the determined emotional classification into data store 280B and in response, receive one or more graphical images that have been pre-classified according to emotional classification, and have emotional classifications that are associated with the first emotion classification tags.

In some examples, computing device 210 may determine, based at least in part the one or more facial features, at least one additional, first-order emotion classification tag, and identify the at least one graphical image from the database of pre-classified images with the emotional classification that is associated with the first, first-order emotion classification tag and the at least one additional, first-order emotion classification tag. In other words, module 262 may utilize a single emotion classification with an option to augment using one or more emotion classification tags to identify graphical images that have emotional classifications matching the emotional classifications of the captured image.

Computing device 210 may produce (430) a graphical compilation of the at least one graphical image and the captured image. For example, module 262 may return to application module 220 an indication of the one or more graphical images that module 262 deems is emotionally relevant to the image of the user. Application module 220 may combine the one or more graphical images with the captured image to produce an animated graphic or movie that the user can share with other users to express his or her feelings.

Computing device 210 may output (440) the at least one graphical image as part of the graphical compilation. For example, application 220 may output a graphical user interface from which computing device 210 can receive input as a user selects the one or more graphical images and inputs the graphic compilation into a communication session associated with the user (e.g., an e-mail, a phone call, a video call, a chat session, or any and all other documents and electronic communication sessions).

Clause 1. A method comprising: obtaining, by a computing device, an indication of an image of a user of the computing device; determining, by the computing device, based on the image, a first emotion classification tag; identifying, by the computing device, at least one graphical image from a database of pre-classified images with an emotional classification that is associated with the first emotion classification tag; and outputting, by the computing device, for display, the at least one graphical image.

Clause 2. The method of clause 1, wherein identifying the at least one graphical image comprises retrieving, by the computing device, from the database of pre-classified images, the at least one graphical image.

Clause 3. The method of any of clauses 1-2, further comprising: capturing, by the computing device, the image of the user.

Clause 4. The method of clause 3, wherein obtaining the indication of the image of the user comprises obtaining, from a memory of the computing device after the camera stores the indication of the image at the memory, the indication of the image of the user.

Clause 5. The method of any of clauses 3-4, wherein the indication of the image includes one or more frames of video or a photographic image.

Clause 6. The method of any of clauses 1-5, further comprising: determining, by the computing device, based on the image, one or more facial features of the user; and determining, by the computing device, based at least in part the one or more facial features, the first emotion classification tag.

Clause 7. The method of any of clauses 1-6, further comprising: determining, by the computing device, based at least in part the one or more facial features, at least one second emotion classification tag; and identifying, by the computing device, the at least one graphical image from the database of pre-classified images with the emotional classification that is associated with the first emotion classification tag and the at least one second emotion classification tag.

Clause 8. The method of any of clauses 1-7, further comprising: outputting, by the computing device, for display, a graphical user interface associated with an application executing at the computing device, wherein the graphical user interface includes a selectable element for inserting the at least one graphical image in a communication associated with the user; and responsive to detecting a user selection of the selectable element, outputting, by the computing device, for display, the at least one graphical image.

Clause 9. The method of clause 8, further comprising: inserting, by the computing device, into the communication, the at least one graphical image in response to detecting the user selection of the selectable element.

Clause 10. The method of any of clauses 1-9, wherein the at least one graphical image comprises an animated graphic or a non-animated graphic.

Clause 11. The method of any of clauses 1-10, further comprising: producing, by the computing device, a graphical compilation of the at least one graphical image and the image, wherein the at least one graphical image is output for display as part of the graphical compilation.

Clause 12. The method of clause 11, wherein producing the graphical compilation comprises: extracting, by the computing device, from the image, a foreground portion of the image; and overlaying, by the computing device, the foreground portion of the image onto the at least one graphical image.

Clause 13. A computing device comprising: a camera configured to capture an image of a user of the computing device; a memory configured to store the image of the user; at least one processor; and at least one module operable by the at least one processor to: obtain, from the memory, an indication of the image of the user of the computing device; determine, based on the image, a first emotion classification tag; identify, based on the first emotion classification tag, at least one graphical image from a database of pre-classified images that has an emotional classification that is associated with the first emotion classification tag; and output, for display, the at least one graphical image.

Clause 14. The computing device of clause 13, further comprising: a display, wherein the camera is a front-facing camera that is configured to capture the image of the user by recording video of the user while graphical information associated with the camera is presented at the display.

Clause 15. The computing device of any of clauses 13-14, further comprising: a communication unit configured to communicate over a network with a remote computing system that stores the database of pre-classified images, wherein the at least one module is further operable by the at least one processor to receive, via the communication unit, from the remote computing system, an indication of the at least one graphical image in response to outputting, via the communication unit, for transmission to the remote computing system, an indication of the first emotion classification tag.

Clause 16. The computing device of any of clauses 13-15, wherein the at least one module is further operable by the at least one processor to: determine, based at least in part the one or more facial features, at least one additional emotion classification tag; and identify the at least one graphical image from the database of pre-classified images with the emotional classification that is associated with the first emotion classification tag and the at least one additional emotion classification tag.

Clause 17. A computer-readable storage medium comprising instructions that, when executed, cause at least one processor of a computing device to: obtain an indication of an image of a user of the computing device; determine, based on the image, a first emotion classification tag; identify, based on the first emotion classification tag, at least one graphical image from a database of pre-classified images that has an emotional classification that is associated with the first emotion classification tag; and output, for display, the at least one graphical image.

Clause 18. The computer-readable storage medium of clause 17, comprising additional instructions that, when executed, cause the at least one processor of the computing device to produce a graphical compilation of the at least one graphical image and the image, wherein the at least one graphical image is output for display as part of the graphical compilation.

Clause 19. The computer-readable storage medium of any of clauses 17-18, comprising additional instructions that, when executed, cause the at least one processor of the computing device to output the at least one graphical image for transmission to a remote device as part of a communication associated with the user.

Clause 20. The computer-readable storage medium of any of clauses 17-19, comprising additional instructions that, when executed, cause the at least one processor of the computing device to: determine, based at least in part the one or more facial features, at least one additional emotion classification tag; and identify the at least one graphical image from the database of pre-classified images with the emotional classification that is associated with the first emotion classification tag and the at least one additional emotion classification tag.

Clause 21. A system comprising means for performing any of the methods of clauses 1-12.

Clause 22. A computing device comprising means for performing any of the methods of clauses 1-12.

Clause 23. The computing device of clause 13 further comprising means for performing any of the methods of clauses 1-12.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperable hardware units, including one or more processors as described above, in conjunction with suitable software and/or firmware.

Various examples have been described. These and other examples are within the scope of the following claims.

What is claimed is:

1. A method, comprising:
outputting, by a computing device, for display, a first user interface associated with an application executing at the computing device, wherein the first user interface includes a selectable element for inserting the at least one graphical image in a communication associated with the user; and
responsive to detecting a user selection of the selectable element:
outputting, by the computing device, for display, a second user interface for controlling a camera of the computing device;
responsive to detecting user input at the second user interface for controlling the camera, obtaining, by the computing device, from the camera, an indication of an image of a user of the computing device;
determining, by the computing device, based on the image, a first emotion classification tag;
identifying, by the computing device, at least one graphical image from a database of pre-classified images with an emotional classification that is associated with the first emotion classification tag;

outputting, by the computing device, for display, a third user interface for selecting one or more of the at least one graphical image;

responsive to detecting user input at the third user interface for selecting the one or more of the at least one graphical image, producing, by the computing device, a graphical compilation including the one or more graphical images and the image; and outputting, by the computing device, for display, the graphical compilation by at least one of:

outputting a fourth user interface for previewing the graphical compilation; or inserting, into the communication, the graphical compilation.

2. The method of claim 1, wherein identifying the at least one graphical image comprises retrieving, by the computing device, from the database of pre-classified images, the at least one graphical image.

3. The method of claim 1, wherein the indication of the image includes one or more frames of video or a photographic image.

4. The method of claim 1, wherein determining a first emotion classification tag comprises:

determining, by the computing device, based on the image, one or more facial features of the user; and determining, by the computing device, based at least in part the one or more facial features, the first emotion classification tag.

5. The method of claim 4, further comprising:

determining, by the computing device, an emotional classification for the image based at least in part on the first emotion classification tag, wherein identifying, by the computing device, the at least one graphical image from the database of pre-classified images with the emotional classification that is associated with the first emotion classification tag comprises matching the emotional classification for the image with the at least one graphical image.

6. The method of claim 1, wherein the at least one graphical image comprises an animated graphic or a non-animated graphic.

7. The method of claim 1, wherein producing the graphical compilation comprises:

extracting, by the computing device, from the image, a foreground portion of the image; and overlaying, by the computing device, the foreground portion of the image onto the at least one graphical image.

8. A computing device comprising:

a camera configured to capture an image of a user of the computing device;

a memory configured to store the image of the user;

at least one processor; and at least one module operable by the at least one processor to:

output, for display, a first user interface associated with an application executing at the computing device, wherein the first user interface includes a selectable element for inserting the at least one graphical image in a communication associated with the user; and responsive to detecting a user selection of the selectable element:

output, for display, a second user interface for controlling the camera of the computing device;

responsive to detecting user input at the second user interface for controlling the camera, obtain, from the memory, an indication of the image of the user of the computing device;

determine, based on the image, a first emotion classification tag;

identify, based on the first emotion classification tag, at least one graphical image from a database of pre-classified images that has an emotional classification that is associated with the first emotion classification tag;

output, for display, a third user interface for selecting one or more of the at least one graphical image;

responsive to detecting user input at the third user interface for selecting the one or more of the at least one graphical image, produce a graphical compilation including the one or more of the at least one graphical image and the image; and output, for display, the graphical compilation by at least;

outputting a fourth user interface for previewing the graphical compilation; or inserting, into the communication, the graphical compilation.

9. The computing device of claim 8, further comprising: a display, wherein the camera is a front-facing camera that is configured to capture the image of the user by recording video of the user while graphical information is presented at the display.

10. The computing device of claim 8, further comprising: a communication unit configured to communicate over a network with a remote computing system that stores the database of pre-classified images, wherein the at least one module is further operable by the at least one processor to receive, via the communication unit, from the remote computing system, an indication of the at least one graphical image in response to outputting, via the communication unit, for transmission to the remote computing system, an indication of the first emotion classification tag.

11. The computing device of claim 8, wherein the at least one module is further operable by the at least one processor to:

determine, based at least in part the one or more facial features, at least one additional emotion classification tag; and identify the at least one graphical image from the database of pre-classified images with the emotional classification that is associated with the first emotion classification tag and the at least one additional emotion classification tag.

12. A non-transitory computer-readable storage medium comprising instructions that, when executed, cause at least one processor of a computing device to:

output, for display, a first user interface associated with an application executing at the computing device, wherein the first user interface includes a selectable element for inserting the at least one graphical image in a communication associated with the user; and responsive to detecting a user selection of the selectable element:

output, for display, a second user interface for controlling a camera of the computing device;

responsive to detecting user input at the second user interface for controlling the camera, obtain, from the camera, an indication of an image of a user of the computing device;

determine, based on the image, a first emotion classification tag;

identify, based on the first emotion classification tag, at least one graphical image from a database of pre-classified images that has an emotional classification that is associated with the first emotion classification tag;

output, for display, a third user interface for selecting one or more of the at least one graphical image;

responsive to detecting user input at the third user interface for selecting the one or more of the at least one graphical image, produce a graphical compilation including the one or more of the at least one graphical image and the image; and output, for display, the graphical compilation by at least one of:
- outputting a fourth user interface for previewing the graphical compilation; or
- inserting, into the communication, the graphical compilation.

13. The non-transitory computer-readable storage medium of claim 12, comprising additional instructions that, when executed, cause the at least one processor of the computing device to: after inserting the graphical compilation into the communication, output, to a remote device, the communication.

14. The non-transitory computer-readable storage medium of claim 12, comprising additional instructions that, when executed, cause the at least one processor of the computing device to:
- determine, based at least in part the one or more facial features, at least one additional emotion classification tag; and
- identify the at least one graphical image from the database of pre-classified images with the emotional classification that is associated with the first emotion classification tag and the at least one additional emotion classification tag.

* * * * *